United States Patent
Gray

(10) Patent No.: US 9,417,677 B2
(45) Date of Patent: Aug. 16, 2016

(54) POWER SUPPLY MANAGEMENT FOR PORTABLE ELECTRONIC DEVICES

(75) Inventor: Robert Cary Gray, Deerfield Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 1266 days.

(21) Appl. No.: 13/339,976

(22) Filed: Dec. 29, 2011

(65) Prior Publication Data

US 2013/0169219 A1 Jul. 4, 2013

(51) Int. Cl.
*H02J 7/00* (2006.01)
*G06F 1/32* (2006.01)
*H04M 3/42* (2006.01)
*H02J 7/02* (2016.01)
*G06F 1/28* (2006.01)

(52) U.S. Cl.
CPC ............... *G06F 1/3206* (2013.01); *G06F 1/28* (2013.01); *G06F 1/3212* (2013.01); *H02J 7/0004* (2013.01); *H02J 7/025* (2013.01); *H04M 3/42* (2013.01); *Y02B 60/1292* (2013.01)

(58) Field of Classification Search
CPC ....... H02J 7/025; H02J 7/0004; G06F 1/3212; G06F 1/28; G06F 1/3206; H04M 3/42; Y02B 60/1292
USPC .................. 320/108, 132, 134, 136
See application file for complete search history.

(56) References Cited

U.S. PATENT DOCUMENTS

| | | | | |
|---|---|---|---|---|
| 5,838,139 A | * | 11/1998 | Greene | G06F 1/30 320/133 |
| 2006/0156209 A1 | * | 7/2006 | Matsuura et al. | 714/798 |
| 2006/0181243 A1 | * | 8/2006 | Graves et al. | 320/116 |
| 2007/0265033 A1 | | 11/2007 | Brostrom | |
| 2008/0007212 A1 | | 1/2008 | Theytaz et al. | |
| 2010/0207575 A1 | * | 8/2010 | Pijnenburg et al. | 320/108 |

(Continued)

FOREIGN PATENT DOCUMENTS

| | | |
|---|---|---|
| EP | 2181884 A1 | 5/2010 |
| JP | 2003348757 | 12/2003 |
| JP | 2004056555 | 2/2004 |

OTHER PUBLICATIONS

Extended European Search Report dated Apr. 16, 2012 for European Patent Application No. 11196107.4.

(Continued)

*Primary Examiner* — Nathaniel Pelton
(74) *Attorney, Agent, or Firm* — Jose Gutman; Fleit Gibbons Gutman Bongini & Bianco P.L.

(57) ABSTRACT

Power management notifications are provided to a user of a portable electronic device by monitoring a current power level of a power supply in a portable electronic device. A determination is made, with the portable electronic device, whether the current power level is one of less than and equal to a given threshold. One or more wireless detection operations are performed to determine whether a power supply charging device is in proximity to the portable electronic device. The power supply charging device is unattached to the portable electronic device. A notification is presented at the portable electronic device, in response to both the current power level is determined to be one of less than and equal to the given threshold, and the power supply charging device being wirelessly detected in proximity to the portable electronic device.

20 Claims, 8 Drawing Sheets

(56) References Cited

U.S. PATENT DOCUMENTS

2010/0225272 A1\* 9/2010 Kirby ............... H04B 5/00
 320/108
2010/0292855 A1 11/2010 Kintner-Meyer

OTHER PUBLICATIONS

Examiner's First Report dated Jul. 8, 2014 for Canadian Patent Application No. 2,799,748.

\* cited by examiner

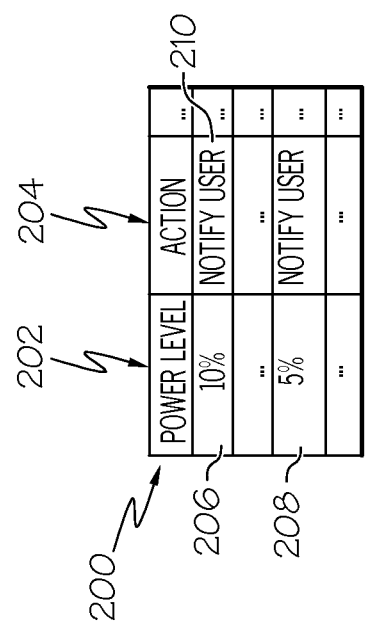
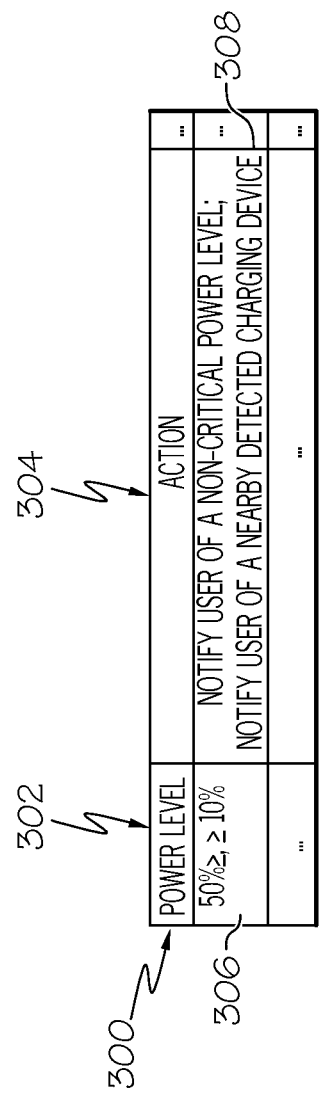

| RULE(S) | LOCATION | CHARGING DEVICE | TIME |
|---|---|---|---|
| RULE_1 | OFFICE 614 | DEVICE_A 616 | 09:00 17:00 618 |
| RULE_2 | N/A | DEVICE_A | ... |
| ... | ... | ... | ... |
| RULE_N | N/A | DEVICE_X | ... |

FIG. 6

POWER SUPPLY MANAGEMENT FOR PORTABLE ELECTRONIC DEVICES

FIELD OF THE DISCLOSURE

The present disclosure generally relates to portable electronic devices, and more particularly to power supply management for portable electronic devices.

BACKGROUND

Efficient power supply management for portable electronic devices, such as wireless communication devices, is an important design consideration. One aspect of power supply management is directed to notifying a user of a device regarding the current power level of the power supply. In general, conventional power supply management mechanisms notify a user when the power level is at a threshold level. This threshold level may be a critical level. In other words, a notification may not be displayed to the user until the power supply is at a level where immediate attention is required or the device will power down shortly thereafter.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which:

FIG. 2 shows a power supply profile according to one example;

FIG. 3 shows another power supply profile according to another example;

FIG. 6 shows another notification rule according to another example;

DETAILED DESCRIPTION

As required, detailed examples are disclosed herein; however, it is to be understood that the disclosed examples are non-limiting and that the systems and methods described below can take various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e., open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop computer, a tablet computer, a personal digital assistant, and other similar devices.

The term "portable electronic device" is intended to broadly cover many different types of electronic devices that are portable. For example, and not for any limitation, a portable electronic device can include any one or a combination of the following: a wireless communication device, a laptop computer, notebook computer, personal computer, Personal Digital Assistant, tablet computer, gaming units, and other handheld electronic devices that can be carried on one's person.

Described below are systems and methods for providing power management notifications to a user of a portable electronic device. In one example, a determination is made with the portable electronic device, as to whether the current power level is one of less than and equal to a given threshold. One or more wireless detection operations are performed to determine whether a power supply charging device is in proximity to the portable electronic device. The power supply charging device is unattached to the portable electronic device. A notification is presented at the portable electronic device, in response to both the current power level is determined to be one of less than and equal to the given threshold, and the power supply charging device being wirelessly detected in proximity to the portable electronic device.

Figure 1:
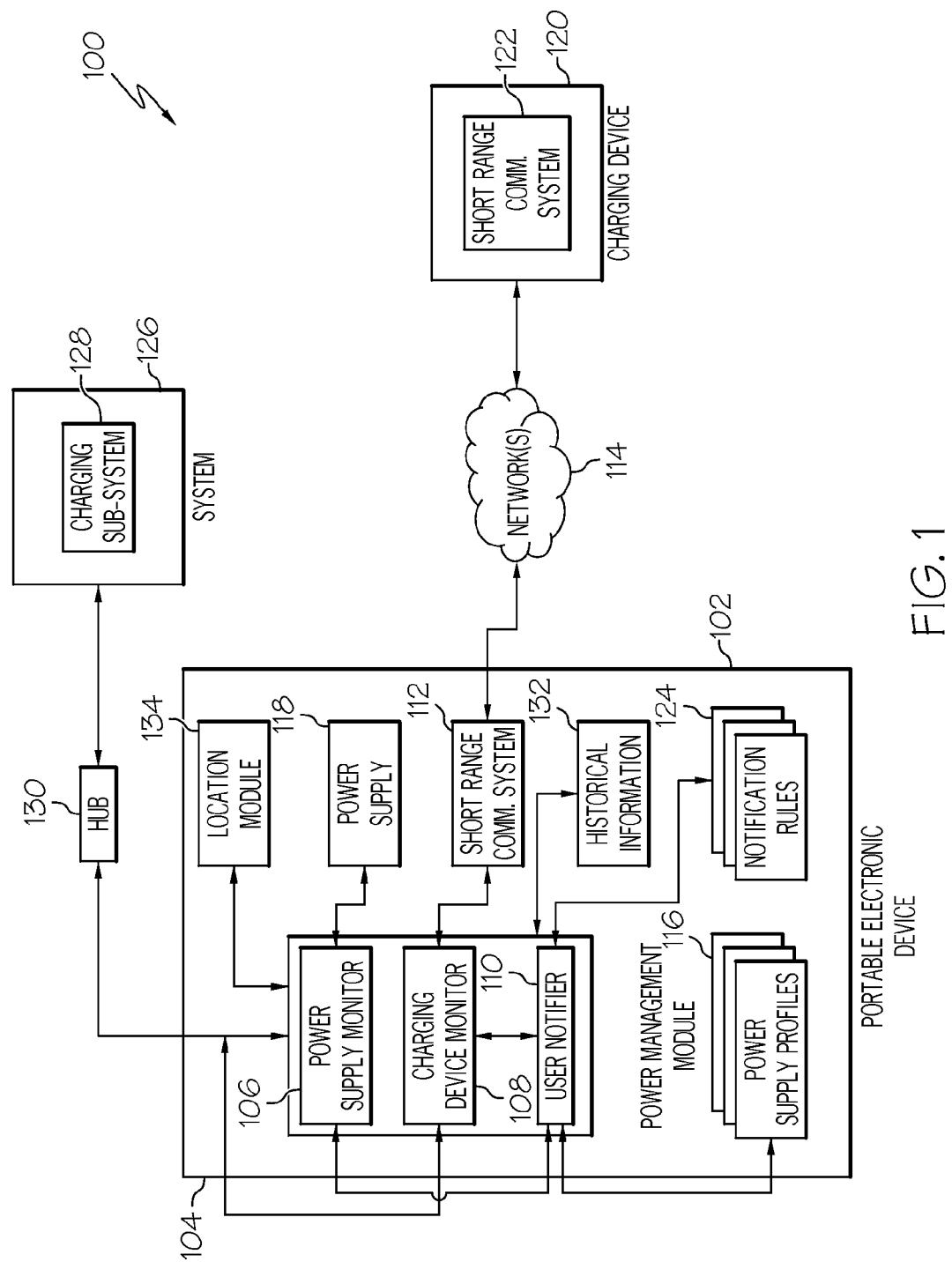
FIG. 1 is a block diagram of an operating environment according to one example.

FIG. 1 is a block diagram illustrating one example of an operating environment for detecting nearby power supply charging devices for a portable electronic device and notifying a user thereof. The operating environment 100 comprises one or more portable electronic devices 102, which in this example are wireless communication devices. The portable electronic device (also referred to herein as a user device) 102 comprises a power management system 104 that monitors current power levels of the portable electronic device 102, monitors for and detects nearby power supply charging devices 120, and prompts users to charge the portable electronic device 102 based on the detection of a charging device 120 and/or the current power level of the portable electronic device 102.

The power management system 104 comprises a power supply monitor 106, a charging device monitor 108, and a user notifier 110. The portable electronic device 102 also comprises a short range communication system 112 that allows the portable electronic device 102 to communicate with other devices via a short range wireless network 114 or directly using short range peer-to-peer protocols without the use of a wireless network 114. The short range communications can be based on any short range wireless technology such as, but not limited to, BLUETOOTH®, ZIGBEE®, and Near Field Communication (NFC) technologies. It should be noted that the portable electronic device 102 can also comprise other wireless link interfaces that allows the portable electronic device 102 to communicate over one or more additional wireless networks such as wireless local area networks and the like. Additionally, while some examples of the present disclosure are discussed as using two-way wireless communication, in some embodiments, the short-range communications subsystem 112 may alternatively operate as a one-way wireless communication system that wirelessly receives transmissions from other compatible wireless transmitter enabled systems 122 and devices. The portable electronic device 102 can utilize one-way wireless communications to receive transmissions from other devices, and thereby to wirelessly detect nearby power supply charging devices 120

The power supply monitor 106 monitors a current power level of the power supply 118 of the portable electronic device 102. The charging device monitor 108, via the short range communication system 112, monitors for nearby (proximate) charging devices 120 that can be used to charge the power supply 118 through one or more interfaces (not shown) of the charging device 120. In this example, the charging device 120 also comprises a short range communication system 122 that allows the charging device 120 to communicate over the short range wireless network 114. In another example, the charging device monitor 108 utilizes wired mechanisms (such as Universal Serial Bus (USB) based wired mechanisms), to detect nearby charging devices 120. The user notifier 110 notifies the user of the portable electronic device 102 that a nearby charging device 120 has been detected. In one example, the charging device 120 is a device that couples to a power source, such as a wall outlet or an information processing system, and also to an interface of the portable electronic device 102 such as, but not limited to, a Universal Serial Bus (USB) port (not shown), for charging the power supply 118. In another example, the charging device 120 can include its own power source for charging the portable electronic device 102.

The portable electronic device 102 also comprises one or more power supply profiles 116 and one or more optional notification preferences/rules 124. The power supply profiles 116 define critical and non-critical power levels (or level thresholds/ranges). A critical power level is a power level at which a minimum amount of power remains in the power supply 118. Critical power levels can also be the power-levels designated by the manufacturer that trigger a power level notification set by the manufacturer. In one example, the user is notified of the current power level of the power supply 118 when the power level reaches a defined critical power level regardless of whether a charging device 120 has been detected. A non-critical power level is a pre-determined power level (or range of power levels), which may be user defined or set by the manufacturer, that is used by the power management system 104 to prompt/notify a user to charge his/her portable electronic device 102 when the power level of the power supply 118 reaches one of these pre-determined levels (or ranges) and a charging device 120 has been detected (either wirelessly or by wired mechanisms or otherwise). The optional notification rules 124, in one example, are a set of user definable and/or preset rules that govern the presentation of power management notifications (i.e., notifications of non-critical power levels and detection of charging devices 120) by the power management system 104. The power management system 104, its components, the power supply profiles 116, and the notification rules 124 are discussed in greater detail below.

In another example, the portable electronic device 102 can be coupled to a system 126, such as an information processing system, comprising a charging subsystem 128 via wired or wireless mechanisms. The example of FIG. 1 shows the portable electronic device 102 being coupled to the system 126 via a hub 130. For example, the portable electronic device 102 can be coupled to a USB hub 130 via one or more USB cables. The hub 130 is a component that allows the portable electronic device 102 to communicate with the system 126 using one or more wire-based mechanisms, but does not charge the power supply 118 of the portable electronic device 102. In this example, the power management system 104 of the portable electronic device 102 is able to detect that the system 126 comprises a charging sub-system 128. The portable electronic device 102 detection, in this example, is based on other than a wireless detection method and system. It should be noted that this example is only used for illustrative purposes and does not limit the present disclosure in any way. As another example, the portable electronic device 102 may detect that the portable electronic device 102 is in proximity to a charging device 120 by other than a wireless detection method and system, using a map (not shown) stored in historical information 132 maintained, for example, at the portable electronic device 102, as will discussed in more detail below. This map can include indication of location of one or more charging devices 120 in general proximity to the portable electronic device 102. The portable electronic device 102 can determine its current location, such as by using device location information available to the portable electronic device 102 from one or more location modules 134, and compare its location relative to the location of a charging device 120 as indicated in the map. If the portable electronic device 102 determines that it is proximate to a charging device 120 indicated on the map and the power level of the power supply 118 reaches one of the pre-determined levels (or ranges), the portable electronic device 102 can prompt/notify a user to charge his/her device 102.

The power management system 104 and its components are now discussed in greater detail. As discussed above, the power management system 104 monitors current power levels of the portable electronic device 102, monitors for and detects nearby power supply charging devices 120, and prompts users to charge the portable electronic device 102 based on the detection of a charging device 120 and the current power level of the portable electronic device 102. As will be shown below, various examples of the present disclosure are advantageous over conventional power management mechanisms utilized on portable electronic devices. For example, conventional power management mechanisms usually only notify the user when the power level of the power supply 118 reaches a critical level. However, various examples of the present disclosure notify the user that one or more charging devices have been detected. This early notification allows the user to charge his/her portable electronic device 102 prior to reaching a critical level at a time that is convenient for the user. However, a user can also be notified of detected charging devices when a critical power level is detected as well.

In one example, the charging device monitor 108, via the short range communication system 112, monitors for and detects one or more charging devices 120. For example, as the portable electronic device 102 comes within a given distance from a charging device 120, the short range communication systems 112, 122 of the portable electronic device 102 and the charging device 120, respectively, communicate with each other using short range wireless communication protocols. This given distance can be defined by the short range communication technology being used or by the user. For example, if the short range communication system 112 is able to detect devices up to 30 feet away, the user is able to configure the power management system 104 to only communicate with charging devices 120 that are 5 feet away. Alternatively, the user can configure the power management system 104 to detect any charging device 120, but only notify the user when the detected charging device 120 is within a given distance from the portable electronic device 102.

When the short range communication systems 112, 122 of the user device and the charging device 120 communicate with each other, the short range communication system 122 of the charging device 120, in one example, sends at least an identifier to the portable electronic device 102. The charging device monitor 108 receives this identifier and analyzes it to determine if a charging device 120 has been detected. For example, this identifier can indicate the device type, such as a charging device, brand, compatible devices, etc. If the charging device monitor 108 determines that a compatible charging device 120 has been detected, the power supply monitor 106 determines the current power level of the power supply 118. It should be noted that the power supply monitor 106 can make this determination prior to the charging device monitor 108 determining that a charging device 120 has been detected. Once the power supply monitor 106 determines the current power level of the power supply 118, the power supply monitor 106 compares the current power level to one or more power supply profiles 116 to determine if the current power level is at a critical or non-critical level (e.g., above, below, or equal to a given threshold).

For example, FIG. 2 shows one example of a power supply profile 200 for critical power levels. As can be seen, the profile 200 shown in FIG. 2 comprises a first column 202, labeled "Power Level", and a second column 204, labeled "Action". The first column 202 comprises one or more entries identifying a critical power level or power level range, which are used as comparison thresholds by the power management system 104. For example, a first entry 206 under this column 202 designates a 10% power level as a first critical power level. A second entry 208 under this column 202 designates a 5% power level as a second critical power level. The second column 204 includes one or more entries indicating one or more actions to be taken by the power management system 104 when a critical power level is detected by the power supply monitor 106. For example, a first entry 210 under this column 204 indicates that when the power supply monitor 106 determines that the current power level of the power supply 118 is at 10%, the power management system 104 notifies the user that the power level has reached a critical level. It should be noted that in one example, the power management system 104 monitors for and notifies the user of a critical power level regardless of whether a charging device 120 has been detected.

FIG. 3 shows one example of a power supply profile 300 for non-critical power levels. As can be seen, the profile 300 shown in FIG. 3 comprises a first column 302, labeled "Power Level", and a second column 304, labeled "Action". The first column 302 comprises one or more entries identifying a non-critical power level or power level range, which are used as comparison thresholds by the power management system 104. For example, a first entry 306 under this column 302 designates a power level range of less than or equal to 50%, but greater than or equal to 10% as a non-critical power level range. The second column 304 includes one or more entries indicating one or more actions to be taken by the power management system 104 when a non-critical critical power level is detected by the power supply monitor 106. For example, a first entry 308 under this column 304 indicates that when the power supply monitor 106 determines that the current power level of the power supply 118 is between 50% and 10%, the power management system 104 notifies the user that the power level has reached a non-critical level and also notifies the user that a nearby charging device 120 has been detected. It should be noted that one or more columns and entries in FIGS. 2-3 can be added and/or deleted.

The power supply monitor 106 compares the current power level of the power supply 118 to the profiles 200, 300 shown in FIGS. 2-3 to determine whether the current power level is at a critical or non-critical power level. If the power supply monitor 106 determines that the current power level is at a critical level as defined by the profile 200 shown in FIG. 2, then the user notifier 110 notifies the user that the power level of the power supply 118 is at a critical level. In one example, the user notifier 110 notifies the user regardless of any notification rules/preferences 124 set by the user. The reason being is that when the power level is at a critical level the portable electronic device 102 is close to powering down and the user should be notified accordingly in order to save any to save any work on the portable electronic device 102 and/or to charge the device. Therefore, in another example, in addition to notifying the user that the power level is currently at a critical level, the user is also notified that a charging device 120 that he/she can use to charge the power supply 118 is nearby. This notification is advantageous over conventional power management mechanisms because a user may not realize that a charging device 120 is nearby. It should be noted that in other examples, the user can have one or more of the notification rules/preferences 124 be applied to a notification for a critical power level.

If the current power level of the power supply 118 is determined to not be at a critical or a non-critical level, the power management system 104 does not notify the user of the current power level nor does the power management system 104 notify the user that a charging device 120 has been detected. However, the power management system 104 can store information associated with the detected charging device 120 in historical information 132 maintained at the portable electronic device 102 for future use. For example, the power management system 104 can store the identifier received from the charging device 120 and location information indicating where and when the charging device 120 was detected. The power management system 104 can utilize one or more location modules 134 such as, but not limited to, Global Positioning Satellite (GPS) system on the portable electronic device 102, to determine the location of where the charging device 120 was detected. Alternatively, the charging device 120 can transmit its location to the power management system 104.

The power management system 104 stores this information in the historical information 132. This information can be used, for example, when the power management system 104 is unable to detect charging devices 120 (e.g., the short range communication systems 112, 122 of one or more of the devices 102, 120 is down) and a non-critical (or a critical) power level has been detected. The power management system 104 can notify the user of the location closest to his/her device 102 where a charging device 120 was detected. It should be noted that the power management system 104 can store the charging device location information whenever it detects a charging device 120 and/or whenever the user utilizes a charging device 120 and not just when the power level is neither critical nor non-critical.

If the current power level of the power supply 118 is determined to be at a non-critical power level as defined by the power supply profile 300 of FIG. 3, then an action is performed by the user notifier 110 as defined by the power supply profile 300 for non-critical power levels. For example, the user notifier 110 notifies the user of the current power level and that a nearby charging device 120 has been detected. It should be noted that any of the notifications discussed herein can include any type of visual, audible, and/or tactile notifications.

Figure 4:
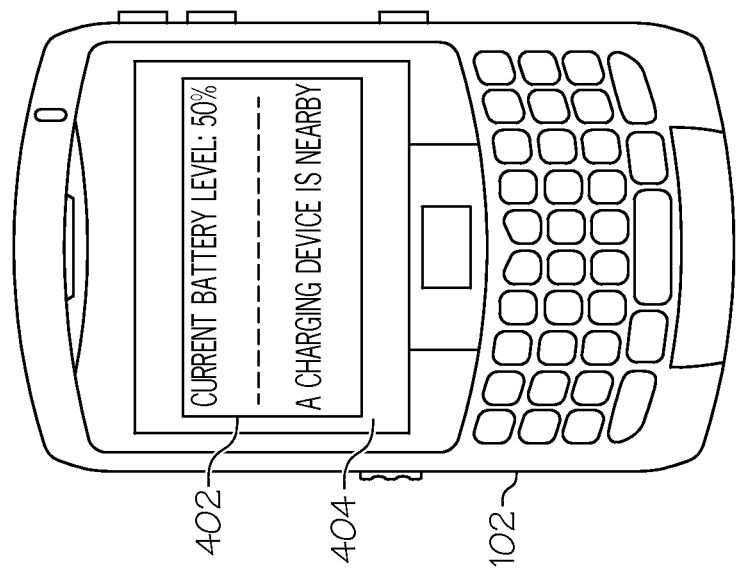
FIG. 4 shows a notification being displayed on a portable electronic device indicating a current power supply level and that a nearby charging device has been detected according to one example.

FIG. 4 shows one example of a notifying the user of a non-critical power level and detected charging device 120. In particular, FIG. 4 shows one example of a portable electronic device 102. As can be seen, the user notifier 110 has presented a message 402 to the user on the display 404 of the device 102. The message 402 notifies the user of the current power level, which is 50% in this example, and that a nearby charging device 120 has been detected. This prompts the user to charge the power supply 118 prior to the power supply 118 reaching a critical level and that it might be convenient to charge now since a nearby charging device 120 was detected. It should be noted that the current power level can be detected in response to detecting a nearby charging device 120 or a charging device 120 can be monitored for in response to a given power level being detected.

As discussed above, one or more notification rules/preferences 124 can be set and/or selected by the user to further govern the notifications received from the power management system 104. These notification rules/preferences 124 can be global or associated with a specific charging device, user device location, user activity, and/or the like. For example, the user may not want to be notified of every charging device that is detected. This is helpful in many environments, such as a business environment, where many different charging devices can be detected relatively close to each other. Therefore, the user can set a notification rule 124 that instructs the power management system 104 to only notify the user when charging devices associated with the user are detected. In this example, the user can add an identifier associated with one or more charging devices to a list of charging devices that the user is to be notified of when the power level is at a non-critical threshold. This list can be maintained on the portable electronic device 102 along with any corresponding notification rule 124 associated with the list.

Figure 5:
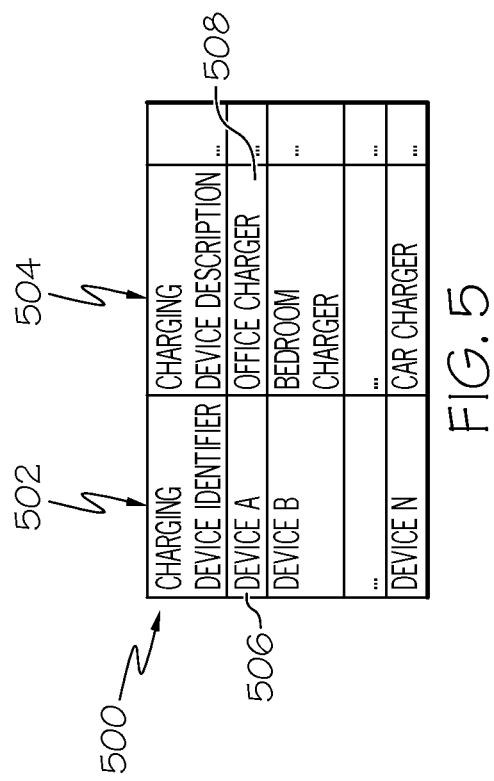
FIG. 5 shows a notification rule according to one example.

FIG. 5 shows one example of a table 500 of charging devices that can be maintained on the portable electronic device 102. As can be seen from FIG. 5, the table 500 includes a first column 502 that includes one or more entries including a unique charging device identifier. A second column 504 includes a brief description of the charging devices associated therewith (if applicable). For example, a first entry 506 under the first column 502 includes the identifier "Device_A". A first entry 508 under the second column describes this charging device as an "Office Charger". It should be noted that instead of the user having to manually enter this information, the power management system 104 can automatically store this information when the user couples the charging device 120 to the portable electronic device 102 for the first time (or any time thereafter). The user can also edit this list as desired. Therefore, in this example, when the power supply monitor 106 detects a charging device 120 and determines that the current power level matches a non-critical level (or range), the power supply monitor 106 only notifies the user of the non-critical power level and of a detected charging device 120 if the detected charging device 120 is within the list of devices shown in the table 500 of FIG. 5.

It should be noted that the power management system 104 can be configured to notify the user of a non-critical power level, but not a detected charging device 120. It should also be noted that the power management system 104 can also be configured to override a notification rule/preference 124 when the power level reaches a critical level. For example, if the power management system 104 detects a charging device 120 when the power level is at a critical level, the power management system 104 can notify the user of a detected charging device even if this charging device is not identified in the table/list 500 of charging devices. This additional notification is advantageous because when the power level reaches a critical threshold, the portable electronic device 102 is usually close to powering down and the user may want to charge his or her using any available charging device.

In another example, the power management system 104 is configured to notify a user of a detected charging device 120 only when the charging device 120 has been detected for a period of time longer than a given threshold. For example, if the current power level of the power supply 118 matches a non-critical level or range in the corresponding power supply profile 116 and the user is walking down the hall of his/her office, the user, in some examples, is notified of every detected charging device 120. However, the user can set a notification rule/preference 124 that configures the power management system 104 to only notify him/her of detected charging devices 120 if the portable electronic device 102 has detected the charging device 120 longer than a given threshold such as, but not limited to, 5 minutes. Therefore, the user is not being constantly notified of charging devices 120 that he/she is nearby and unlikely to use.

Additionally, the power management system 104 can be configured to only notify the user of detected charging devices 120 when the portable electronic device 102 is within a given location such as, but not limited to, his/her office, car, home, bedroom, etc. For example, using one or more location determining mechanisms 134 such as, but not limited to, Global Positioning Satellite (GPS) technologies, the power management system 104 can determine the current location of the portable electronic device 102. The user can create a location profile that includes one or more locations where the user wants to be notified of detected charging devices 120.

Therefore when the power supply monitor 106 determines that the current power level is at a defined non-critical level, the power management system 104 determines if the portable electronic device 102 is at a defined location as indicated by a location profile. If so, the user is notified of any detected charging devices 120. If not, the user is not notified of a detected charging device 120. In another example, the power management system 104 does not begin to determine if the current power level is at a defined non-critical level and/or monitor for charging devices 120 until the portable electronic device 120 is determined to be at a location identified in a location profile.

In another example, the power management system 104 can be configured to notify the user of detected charging devices 120 only during defined period of times. For example, a time profile can be created by a user that indentifies specific periods of time that the user wants to be notified of detected charging devices 120. When the power supply monitor 106 determines that the current power level is at a defined non-critical level, the power management system 104 determines if the current time is within a time period as defined by the location profile. If so, the user notifier 110 notifies the user of any detected charging devices 120. If not, the user is not notified of a detected charging device 120. In another example, the power management system 104 does not begin to determine if the current power level is at a defined non-critical level and/or monitor for charging devices 120 until the define period of time occurs.

The power management system 104 can also be configured with respect to a user's travels. For example, a user can set a rule/preference 124 that indicates when the user is in an automobile the power management system 104 is to notify the user of detected charging devices for trips longer than a given amount of time. In this example, the power management system 104 is able to communicate with the GPS system of the automobile to obtain destination information. The power management system 104 is then able to determine if the user will be traveling longer than the defined period of time. Alternatively, the power management system 104 can maintain historical information with respect to a user's travels. For example, the power management system 104 can maintain a travel history that includes the day and starting/end times associated with a user's travel. Based on this historical information the power management system 104 can determine if the user is likely to travel longer than the period of time defined in the notification rule/preference 124. For example, if the user leaves for work around 8:00 a.m. every morning and travels for approximately 30 minutes, the power management system 104 can maintain a history of this information. Then, when the power management system 104, via a mechanism such as an accelerometer, gyroscope, GPS, etc., determines that the user has begun to travel, the system 104 can compare the current day/time with its travel history to determine that the user will likely be traveling for a given amount of time. If the determined amount of time is greater than the time period defined in the rule/preference 124, the user is notified of the detected charger 120.

It should be noted that two or more notification rules/preferences 124 can be combined. For example, the user can select a rule instructing the power management system 104 to only notify the user with respect to charging devices associated with the user (See FIG. 4) and a rule for the notification to occur at a given location such as the user's office. In addition, one or more of the notification rules/preferences 106 can be associated with a given charging device and/or a given location. For example, the user can associate a notification rule/preference 124 to a given charging device that states that the user is to only be notified of this device between 10:00 p.m. and 12:00 a.m. when the user device is at the user's home.

FIG. 6 shows a table 600 of various notification rules/preferences. In particular, the table 600 of FIG. 6 comprises a first column 602, labeled "Rule(s)"; a second column 604, labeled "Location"; a third column 606, labeled "Charging Device", and a fourth column 608, labeled "Time". The first column 602 comprises entries identifying a given rule. For example, a first entry 610 under this column identifies the conditions in the first row 612 as "Rule_1". The second column 604 includes entries listing any location requirements/conditions. For example, a first entry 614 under this column 604 identifies the user's office as a location requirement. The third column 606 comprises entries identifying one or more charging devices 120 for which the user wants notifications. For example a first entry 616 under column 606 indicates that the user wants to be notified when charging device "Device_A" is detected. The fourth column 608 comprises entries identifying a given time or interval of time during which a user is to be notified of detected charging devices 120 and non-critical power levels. For example, a first entry 618 under this column 608 indicates that the user only wants to be notified of detected charging devices 120 and non-critical power levels between 9:00 a.m. and 5:00 p.m. Therefore, if the user has selected Rule_1 to apply, the power management system 104 only notifies the user that the charging device Device_A has been detected and of a detected defined non-critical power supply level if Device_A is in the user's office and the current time is between 9:00 a.m. and 5:00 p.m. It should be noted that the example shown in FIG. 6 is only one applicable example and other information can be added/deleted to/from the table 600.

The user can create, delete, and/or or modify the notification rules/preferences 124. In addition, the power management system 104 can dynamically update information within the notification rules/preferences 124 as well. For example, the power management system 104 can detect that the user normally couples a given charging device 120 to the portable electronic device 102 between 10:00 p.m. and 11:00 p.m. on the weekdays. The power management system 104 can add this given charging device 120 to the list of charging devices associated with the user (if not already done) and update a time profile to include this time frame as a notification time frame.

In a further example, the power management system 104 monitors and tracks when the user is notified of a non-critical power level and a detected charging device 120. In this example, the power management system 104 prevents additional notifications from presented to the user if another notification was presented within a given time frame. For example, if a non-critical power level is a range such as 50%-30%, the portable electronic device 102 can be within this power level range for a long time depending on how the device 102 is being used (or not used). During this time, the power management system 104 can detect many charging devices 120 in a short period of time. Also, based on the technology of the communication subsystem 112, charging devices 120 may be detected within inches of a few feet of the portable electronic device 102. Therefore, power management system 104 can detect the same charging device many times over a short period of time depending on how the portable electronic device 102 is moved.

Therefore, the power management system 104 can be configured to only notify the user of detected charging devices 120 (or the same detected charging device 120) after a given interval of time has passed since the last notification was presented to the user. Once the user couples the charging device 120 to the portable electronic device 102, the power management device 104 halts the charging device detection process until the user unplugs the charging device 120.

Figure 7:
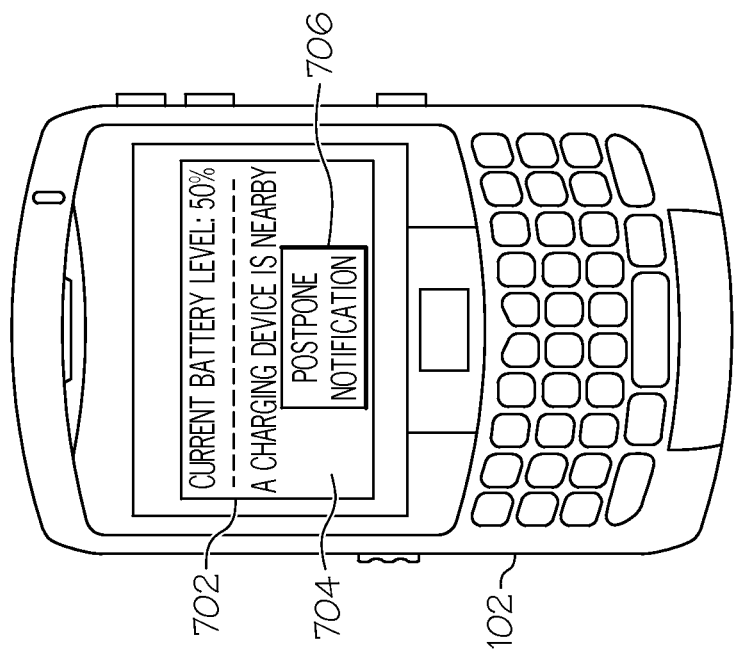
FIG. 7 shows a notification being displayed on a portable electronic device according to one example.

Additionally, a notification presented to the user can give the user the option to postpone the notification for a given amount of time, which can be preset or entered by the user, or until another non-critical power level is detected, which can be preset or entered by the user as well. For example, FIG. 7 shows another notification 702 being presented to the user on the display 704 of the portable electronic device 102. FIG. 7 also shows that the notification 702 has an option 706 that the user can select to postpone the notification. As discussed above, this option 706 instructs the power management system 104 to redisplay the notification 702 after a given interval of time has passed and/or another non-critical power level is detected.

In addition to the above examples, the power management system 104 of the portable electronic device 102 can also notify the user to charge his/her device when coupled to a system 126 such as, but not limited to, and information processing system. For example, the portable electronic device 102 may be coupled to a hub 130 attached to the system 126 or wirelessly coupled to the system 126. In this example, the charging device monitor 108 detects that the portable electronic device 102 is coupled to a system 126 that comprises a charging sub-system 128. Therefore, when the power supply monitor 106 detects that the power supply level is at a defined non-critical (or critical) level, the user notifier 110 can prompt the user to attach the portable electronic device 102 directly to the system 126 for charging. In another example, the system 126 itself can monitor the power level of the portable electronic device 102 coupled thereto. When the system 126 detects that the power supply level of the portable electronic device 102 is at a defined non-critical (or critical) level, the system can prompt the user, either on the display of the portable electronic device 102 or a user interface coupled to the system 126, such as the system display, to attach the portable electronic device 102 directly to the system 126 for charging.

Figure 8:
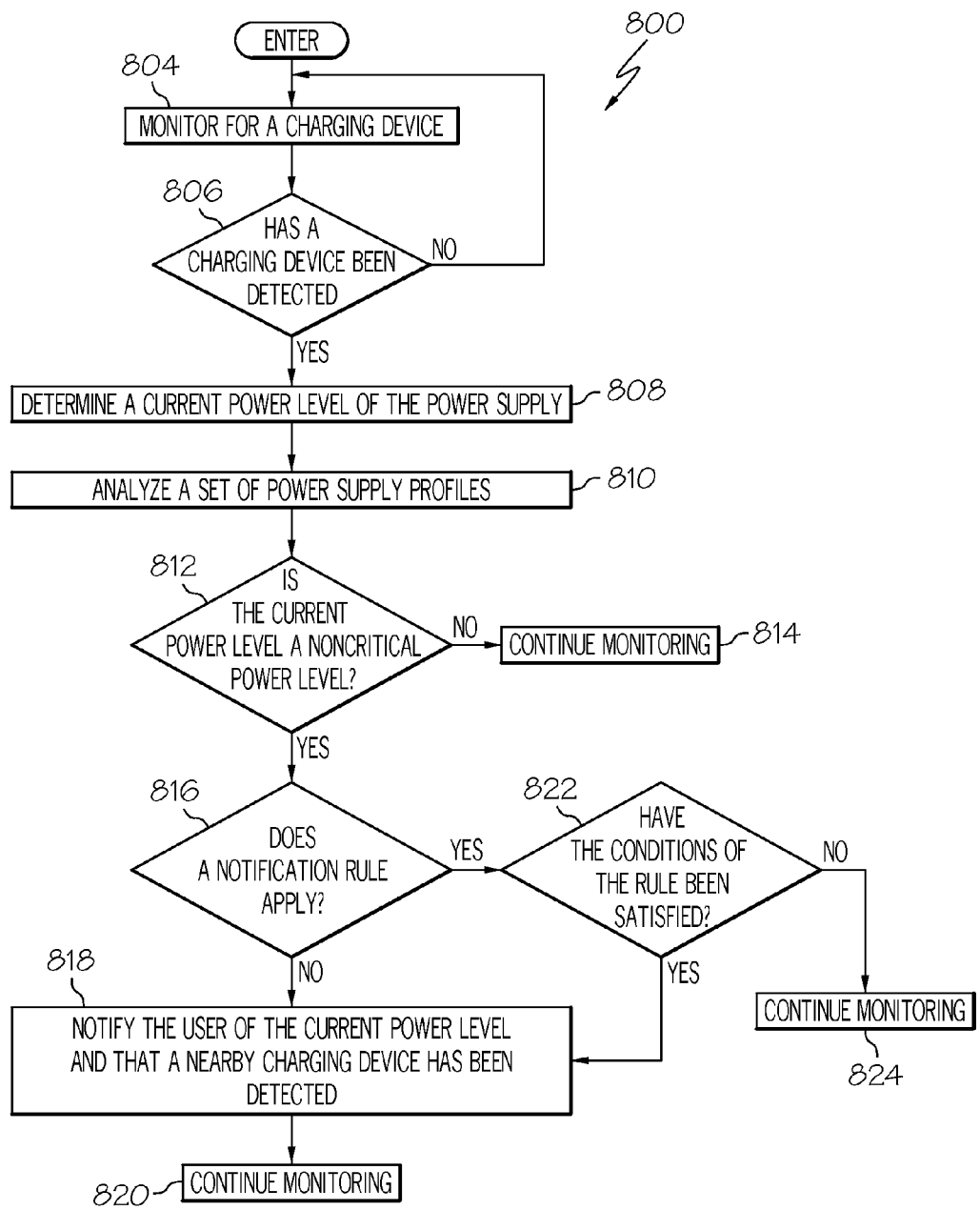
FIG. 8 shows a power management and charging device detection process performed by the portable electronic device illustrated in FIG. 1.

FIG. 8 is a flow diagram for a power management and charging device detection process 800. The power management and charging device detection process 800 monitors for charging devices and notifies a user of a detected charging device based on a current power supply level of the user's portable electronic device as discussed above with respect to FIGS. 1-7. The power management and charging device detection process 800 is performed by the power management system 104 of the portable electronic device 102.

The power management and charging device detection process 800 begins by monitoring for a charging device 120, at 804, as discussed above. A determination is made, at 806, as to whether a charging device 120 has been detected. If the result of this determination is negative, the process 800 continues to monitor for a charging device, at 804. If the result of this determination is positive, a current power level of the portable electronic device power supply 118 is determined, at 808. It should be noted that instead of determining a current power level of the power supply 118 in response to detecting a nearby charging device, the power level can first be detected and then a charging device 120 can be monitored for in response thereto.

A set of power supply profiles 116 are analyzed, at 810. A determination is made, at 812, as to whether the current power level is a pre-determined power level (e.g., a critical or non-critical level). If the result of this determination is negative, the process continues to monitor for a charging device, at 814. If the result of this determination is positive, a determination is made as to whether a notification rule/preference 124 applies, at 816. If the result of this determination is negative, the user is notified of both the current power level and that a nearby charging device 120 has been detected, at 818. The process then continues to monitor for a charging device, at 820. If the result of this determination is positive, another determination is made as to whether the conditions of the rule/preference 124 have been satisfied, at 822. If the result of this determination is negative, the process then continues to monitor for a charging device, at 824. If the result of this determination is positive, the user is notified of both the current power level and that a nearby charging device 120 has been detected, at 818. The process then continues to monitor, at 820.

Figure 9:
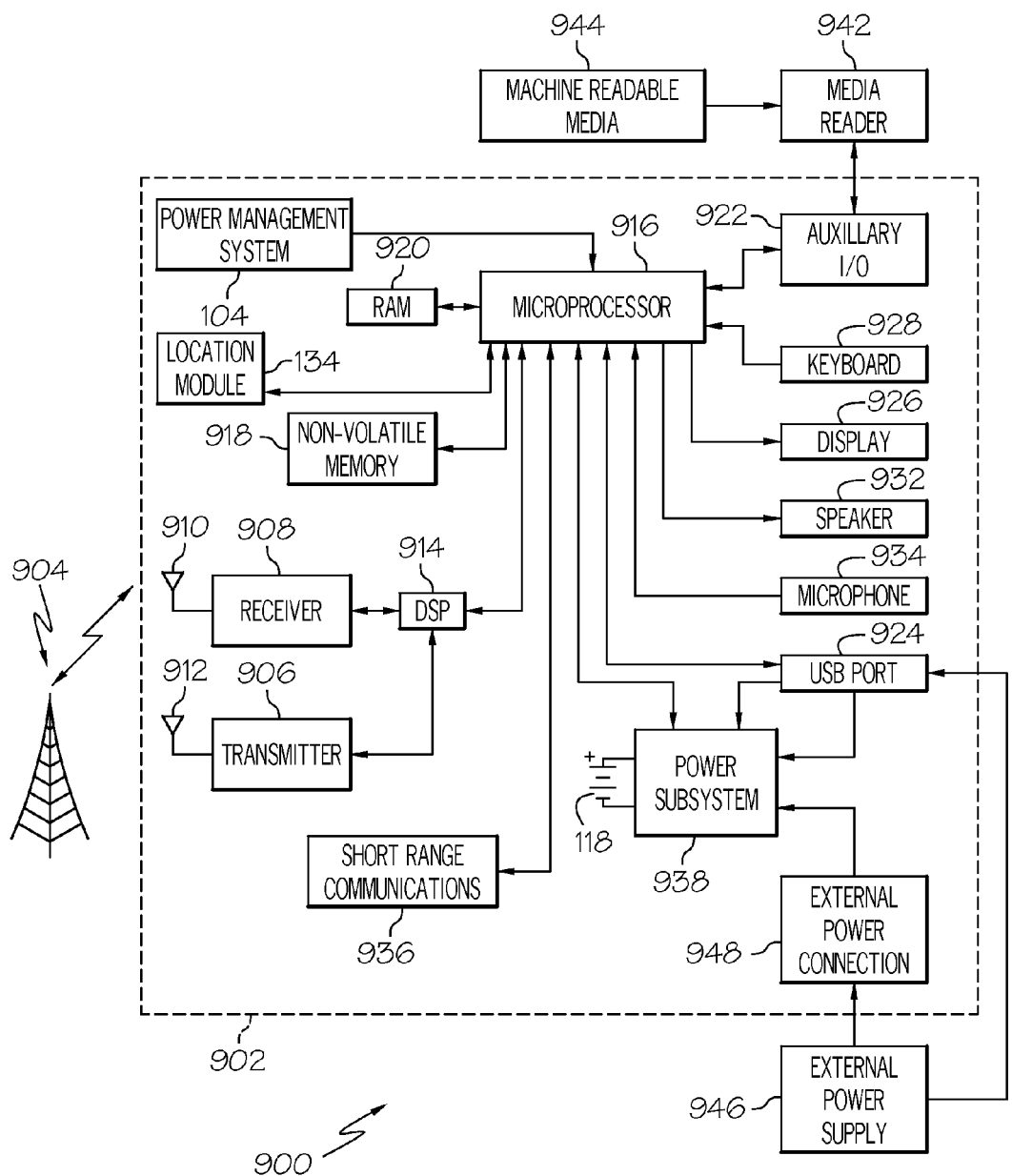
FIG. 9 is a block diagram of an electronic device and associated components in which the systems and methods disclosed herein may be implemented.

FIG. 9 is a block diagram of a portable electronic device and associated components 900 in which the systems and methods disclosed herein may be implemented. In this example, a portable electronic device 902 is the portable electronic device 102 of FIG. 1 and is a wireless two-way communication device with voice and data communication capabilities. Such electronic devices communicate with a wireless voice or data network 904 using a suitable wireless communications protocol. Wireless voice communications are performed using either an analog or digital wireless communication channel. Data communications allow the portable electronic device 902 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated portable electronic device 902 is an example electronic device that includes two-way wireless communications functions. Such electronic devices incorporate communication subsystem elements such as a wireless transmitter 906, a wireless receiver 908, and associated components such as one or more antenna elements 910 and 912. A digital signal processor (DSP) 914 performs processing to extract data from received wireless signals and to generate signals to be transmitted. The particular design of the communication subsystem is dependent upon the communication network and associated wireless communications protocols with which the device is intended to operate.

The portable electronic device 902 includes a microprocessor 916 that controls the overall operation of the portable electronic device 902. The microprocessor 916 interacts with the above described communications subsystem elements and also interacts with other device subsystems such as non-volatile memory 918 and random access memory (RAM) 920. The non-volatile memory 918 and RAM 920 in one example contain program memory and data memory, respectively. Also, the power supply profiles 116, notification rules/preferences 124, and historical information 132 can be stored in the non-volatile memory 918 as well. The microprocessor 916 also interacts with the power management system 104, the location module 134, an auxiliary input/output (I/O) device 922, a Universal Serial Bus (USB) Port 924, a display 926, a keyboard 928, a speaker 932, a microphone 934, a short-range communications subsystem 936, a power subsystem 938, and any other device subsystems.

A power supply 118, such as a battery, is connected to a power subsystem 938 to provide power to the circuits of the portable electronic device 902. The power subsystem 938 includes power distribution circuitry for providing power to the portable electronic device 902 and also contains battery charging circuitry to manage recharging the battery power supply 118. The power subsystem 938 includes a battery monitoring circuit that is operable to provide a status of one or more battery status indicators, such as remaining capacity, temperature, voltage, electrical current consumption, and the like, to various components of the portable electronic device 902. The power management subsystem 938 may also include the power management system 104 as well. An external power supply 946, such as the charging device 120 discussed above, is able to be connected to an external power connection 948.

The USB port 924 further provides data communication between the portable electronic device 902 and one or more external devices. Data communication through USB port 924 enables a user to set preferences through the external device or through a software application and extends the capabilities of the device by enabling information or software exchange through direct connections between the portable electronic device 902 and external data sources rather than via a wireless data communication network.

Operating system software used by the microprocessor 916 is stored in non-volatile memory 918. Further examples are able to use a battery backed-up RAM or other non-volatile storage data elements to store operating systems, other executable programs, or both. The operating system software, device application software, or parts thereof, are able to be temporarily loaded into volatile data storage such as RAM 920. Data received via wireless communication signals or through wired communications are also able to be stored to RAM 920. As an example, a computer executable program configured to perform the power management and charging device detection process 800, described above, is included in a software module stored in non-volatile memory 918.

The microprocessor 916, in addition to its operating system functions, is able to execute software applications on the portable electronic device 902. A predetermined set of applications that control basic device operations, including at least data and voice communication applications, is able to be installed on the portable electronic device 902 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the portable electronic device 902 through, for example, the wireless network 904, an auxiliary I/O device 922, USB port 924, short-range communications subsystem 936, or any combination of these interfaces. Such applications are then able to be installed by a user in the RAM 920 or a non-volatile store for execution by the microprocessor 916.

In a data communication mode, a received signal such as a text message or web page download is processed by the communication subsystem, including wireless receiver 908 and wireless transmitter 906, and communicated data is provided the microprocessor 916, which is able to further process the received data for output to the display 926, or alternatively, to an auxiliary I/O device 922 or the USB port 924. A user of the portable electronic device 902 may also compose data items, such as e-mail messages, using the keyboard 928, which is able to include a complete alphanumeric keyboard or a telephone-type keypad, in conjunction with the display 926 and possibly an auxiliary I/O device 922. Such composed items are then able to be transmitted over a communication network through the communication subsystem.

For voice communications, overall operation of the portable electronic device 902 is substantially similar, except that received signals are generally provided to a speaker 932 and signals for transmission are generally produced by a microphone 934. Alternative voice or audio I/O subsystems, such as a voice message recording subsystem, may also be implemented on the portable electronic device 902. Although voice or audio signal output is generally accomplished primarily through the speaker 932, the display 926 may also be used to provide an indication of the identity of a calling party, the duration of a voice call, or other voice call related information, for example.

Depending on conditions or statuses of the portable electronic device 902, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 936, such as the short range communication system 112 shown in FIG. 1, provides for communication between the portable electronic device 902 and different systems or devices, which need not necessarily be similar devices. For example, the short-range communications subsystem 936 may include an infrared device and associated circuits and components or a Radio Frequency based communication module such as one supporting BLUETOOTH® communications, to provide for communication with similarly-enabled systems and devices. Additionally, while examples of the present disclosure have been discussed as using two-way wireless communication, in some embodiments, the short-range communications subsystem 936 may alternatively operate as a one-way wireless communication system that wirelessly receives transmissions from other compatible wireless transmitter enabled systems and devices. That is, as shown in FIG. 1, the short range communication subsystem 112, 122 and related short range wireless network 114, are not limited to two-way wireless communications. In alternative embodiments one-way wireless communications may be used to allow the user device (portable electronic device) 102 to communicate with other devices, such as to wirelessly detect nearby power supply charging devices 120.

A media reader 942 is able to be connected to an auxiliary I/O device 922 to allow, for example, loading computer readable program code of a computer program product into the portable electronic device 902 for storage into non-volatile memory 918. In one example, computer readable program code includes instructions for performing the power management and charging device detection process 800, described above. One example of a media reader 942 is an optical drive such as a CD/DVD drive, which may be used to store data to and read data from a computer readable medium or storage product such as computer readable storage media 944. Examples of suitable computer readable storage media include optical storage media such as a CD or DVD, magnetic media, or any other suitable data storage device. Media reader 942 is alternatively able to be connected to the electronic device through the USB port 924 or computer readable program code is alternatively able to be provided to the portable electronic device 902 through the wireless network 904.

The present subject matter can be realized in hardware, software, or a combination of hardware and software. A system can be realized in a centralized fashion in one computer system, or in a distributed fashion where different elements are spread across several interconnected computer systems. Any kind of apparatus adapted for carrying out the methods described herein is suitable. The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a non-transitory computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer readable medium may include volatile storage such as RAM, buffers, cache memory, and network circuits. Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. A method of providing power management notifications for a portable electronic device, the method comprising:
monitoring a current power level of a power supply in a portable electronic device, the power level range of the power supply comprising first and second thresholds,
the first threshold being a user-defined non-critical power level that is higher than the second threshold, and
the second threshold being a critical power level indicating the portable electronic device is close to powering down and losing operation;
determining, with the portable electronic device, whether the current power level is one of less than and equal to the first threshold;
wirelessly detecting, via short range communications with at least one power supply charging device, identification information associated with the power supply charging device identifying at least whether the power supply charging device is in proximity to, and compatible with, the portable electronic device, the power supply charging device being unattached to the portable electronic device; and
presenting, based on one or more user-defined notification rules associated with a non-critical power level of the power supply in the portable electronic device, a first notification at the portable electronic device, in response to both:
the current power level being determined to be one of less than and equal to the first threshold, and
the power supply charging device being wirelessly detected in proximity to, and compatible with, the portable electronic device; and wherein the determining comprises determining, with the portable electronic device, whether the current power level is one of less than and equal to the first threshold and greater than the second threshold, and wherein the presenting the first notification is in response to both:
the current power level being determined to be one of less than and equal to the first threshold and greater than the second threshold, and
the power supply charging device being wirelessly detected in proximity to, and compatible with, the portable electronic device; and
further comprising:
determining, with the portable electronic device, whether the current power level is one of less than and equal to the second threshold; and
presenting a second notification at the portable electronic device, regardless of any notification rules set by a user of the portable electronic device, the second notification indicating that a power supply charging device is nearby, in response to both:
the current power level being determined to be one of less than and equal to the second threshold which is the critical power level, and
the power supply charging device being wirelessly detected in proximity to the portable electronic device.

2. The method of claim 1, where the first notification indicates that both:
the current power level is determined to be one of less than and equal to the first threshold, and
the power supply charging device is wirelessly detected in proximity to the portable electronic device.

3. The method of claim 1, where the wirelessly detecting comprises wireless communication over a short range wireless network between the portable electronic device and the power supply charging device.

4. The method of claim 3, where the power supply charging device is wirelessly detected using a short range communication system based on a short range wireless technology comprising at least one of BLUETOOTH®, ZIGBEE®, Near Field Communication (NFC) technology, and a wireless local area network.

5. The method of claim 4, wherein the short range communication system uses one-way wireless communications to wirelessly receive transmissions from the power supply charging device thereby wirelessly detecting the power supply charging device via at least one of:
a Near Field Communication system;
a BLUETOOTH® communication system;
a ZIGBEE® communication system; and
a wireless local area network.

6. The method of claim 1, further comprising:
determining a distance of the power supply charging device from the portable electronic device; and
comparing the distance of the power supply charging device to a distance threshold,
where the first notification is presented to the user in response to the distance of the power supply charging device being one of less than and equal to the distance threshold.

7. The method of claim 1, further comprising:
preventing a subsequent notification from being presented for a given interval of time after the first notification has been presented, in response to both the current power level being one of less than and equal to the given threshold and the power supply charging device being wirelessly detected.

8. The method of claim 1, where presenting the first notification is based on one or more notification rules comprising at least one of a temporal requirement, a location requirement, and a power supply charging device requirement.

9. The method of claim 1, wherein the
presenting a second notification at the portable electronic device indicating that a power supply charging device is nearby, in response to both:
the current power level being determined to be one of less than and equal to the second threshold which is the critical power level, and
the power supply charging device being wirelessly detected in proximity to the portable electronic device, is based on one or more user-defined notification rules associated with the critical power level of the power supply in the portable electronic device.

10. A portable electronic device comprising:
a memory;
a processor communicatively coupled to the memory; and
a power management system communicatively coupled to the memory and the processor, the power management system configurable to:
monitor a current power level of a power supply in a portable electronic device, the power level range of the power supply comprising first and second thresholds,
the first threshold being a user-defined non-critical power level that is higher than the second threshold, and the second threshold being a critical power level indicating the portable electronic device is close to powering down and losing operation;
determine whether the current power level is one of less than and equal to the first threshold;
wirelessly detect, via short range communications with at least one power supply charging device, identification information associated with the power supply charging device identifying at least whether the power supply charging device is in proximity to the portable electronic device, the power supply charging device being unattached to the portable electronic device; and
present, based on one or more user-defined notification rules associated with a non-critical power level of the power supply in the portable electronic device, a first notification at the portable electronic device, in response to both:
the current power level being determined to be one of less than and equal to the first threshold, and
the power supply charging device being wirelessly detected in proximity to, and compatible with, the portable electronic device; and wherein the determining comprises determining, with the portable electronic device, whether the current power level is one of less than and equal to the first threshold and greater than the second threshold, and wherein the presenting the first notification is in response to both:
the current power level being determined to be one of less than and equal to the first threshold and greater than the second threshold, and
the power supply charging device being wirelessly detected in proximity to, and compatible with, the portable electronic device; and
further comprising:
determining, with the portable electronic device, whether the current power level is one of less than and equal to the second threshold; and
presenting a second notification at the portable electronic device, regardless of any notification rules set by a user of the portable electronic device, the second notification indicating that a power supply charging device is nearby, in response to both:
the current power level being determined to be one of less than and equal to the second threshold which is the critical power level, and
the power supply charging device being wirelessly detected in proximity to the portable electronic device.

11. The portable electronic device of claim 10, where the first notification indicates that both:
the current power level is determined to be one of less than and equal to the first threshold, and
the power supply charging device is wirelessly detected in proximity to the portable electronic device.

12. The portable electronic device of claim 10, where the wirelessly detecting comprises wireless communication over a short range wireless network between the portable electronic device and the power supply charging device.

13. The portable electronic device of claim 12, where the power supply charging device is wirelessly detected using a short range communication system based on a short range wireless technology comprising at least one of BLUETOOTH®, ZIGBEE®, Near Field Communication (NFC) technology, and a wireless local area network.

14. The portable electronic device of claim 10, the power management system further configurable to:
determine a distance of the power supply charging device from the portable electronic device; and
compare the distance of the power supply charging device to distance threshold,
where the first notification is presented to the user in response to the distance of the power supply charging device being one of less than and equal to the distance threshold.

15. A computer program product for providing power management notifications to a user of a portable electronic device, the computer program product comprising:
a non-transitory computer readable storage medium having computer readable program code embodied therewith, the computer readable program code comprising instructions for:
monitoring a current power level of a power supply in a portable electronic device, the power level range of the power supply comprising first and second thresholds,
the first threshold being a user-defined non-critical power level that is higher than the second threshold, and
the second threshold being a critical power level indicating the portable electronic device is close to powering down and losing operation;
determining, with the portable electronic device, whether the current power level is one of less than and equal to the first threshold;
wirelessly detecting, via short range communications with at least one power supply charging device, identification information associated with the power supply charging device identifying at least whether the power supply charging device is in proximity to, and compatible with, the portable electronic device, the power supply charging device being unattached to the portable electronic device; and
presenting, based on one or more user-defined notification rules associated with a non-critical power level of the power supply in the portable electronic device, a first notification at the portable electronic device, in response to both:
the current power level being determined to be one of less than and equal to the first threshold, and
the power supply charging device being wirelessly detected in proximity to, and compatible with, the portable electronic device; and wherein the determining comprises determining, with the portable electronic device, whether the current power level is one of less than and equal to the first threshold and greater than the second threshold, and wherein the presenting the first notification is in response to both:
the current power level being determined to be one of less than and equal to the first threshold and greater than the second threshold, and
the power supply charging device being wirelessly detected in proximity to, and compatible with, the portable electronic device; and
further comprising:
determining, with the portable electronic device, whether the current power level is one of less than and equal to the second threshold; and
presenting a second notification at the portable electronic device, regardless of any notification rules set by a user of the portable electronic device, the second notification indicating that a power supply charging device is nearby, in response to both:

the current power level being determined to be one of less than and equal to the second threshold which is the critical power level, and the power supply charging device being wirelessly detected in proximity to the portable electronic device.

16. The computer program product of claim 15, where the first notification indicates that both:

the current power level is determined to be one of less than and equal to the first threshold, and the power supply charging device is wirelessly detected in proximity to the portable electronic device.

17. The computer program product of claim 15, where the wirelessly detecting comprises wireless communication over a short range wireless network between the portable electronic device and the power supply charging device.

18. The computer program product of claim 17, where the power supply charging device is wirelessly detected using a short range communication system based on a short range wireless technology comprising at least one of BLUETOOTH®, ZIGBEE®, Near Field Communication (NFC) technology, and a wireless local area network.

19. The computer program product of claim 15, further comprising instructions for:

determining a distance of the power supply charging device from the portable electronic device; and comparing the distance of the power supply charging device to a distance threshold, where the first notification is presented to the user in response to the distance of the power supply charging device being one of less than and equal to the distance threshold.

20. The computer program product of claim 15, where presenting the first notification is based on one or more notification rules comprising at least one of a temporal requirement, a location requirement, and a power supply charging device requirement.

* * * * *